(No Model.)
V. M. BACKUS.
VEHICLE SPRING.
No. 274,547. Patented Mar. 27, 1883.
Fig. 1.
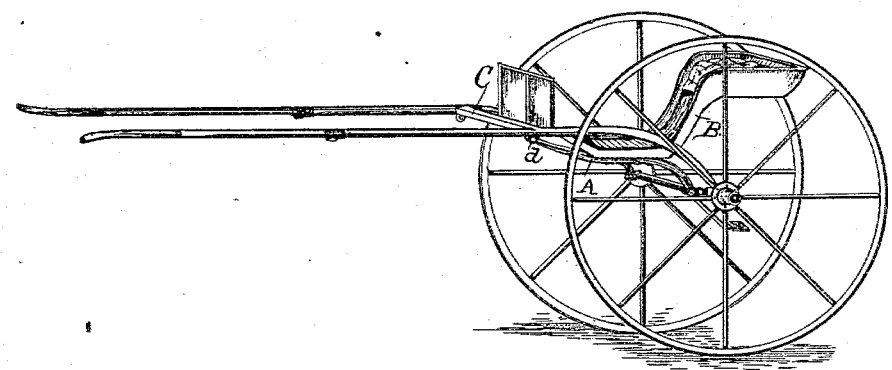
Fig. 2.
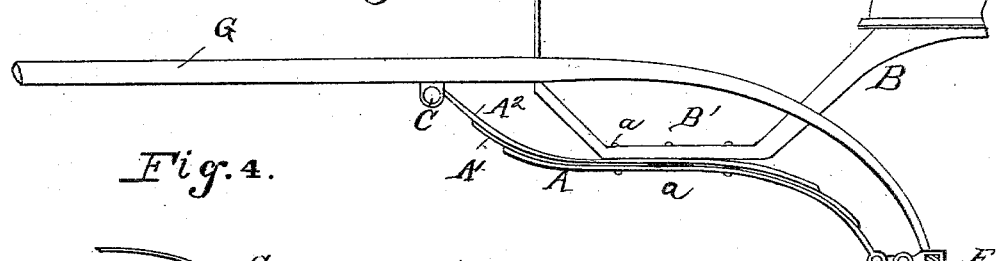
Fig. 4.
Fig. 3.
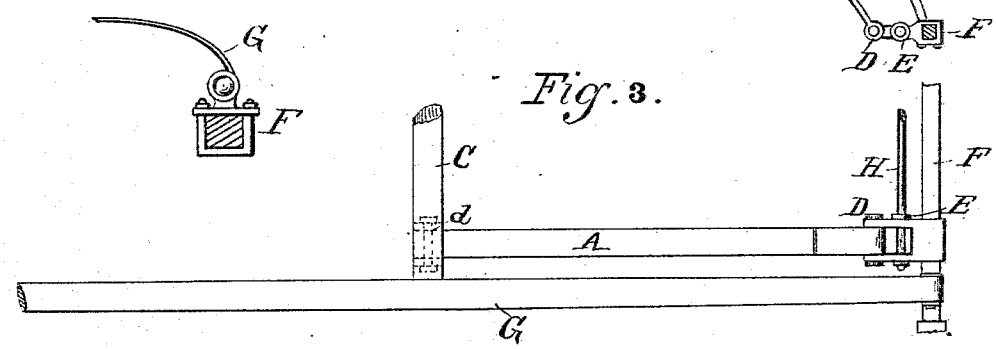
WITNESSES.
Jacob W. Loeper
John W. Eilacher
INVENTOR.
Victor M. Backus.
Tallmadge & MacDonald
Attys.

UNITED STATES PATENT OFFICE.

VICTOR M. BACKUS, OF INDIANAPOLIS, INDIANA.

VEHICLE-SPRING.

SPECIFICATION forming part of Letters Patent No. 274,547, dated March 27, 1883.

Application filed June 29, 1882. (No model.)

*To all whom it may concern:*

Be it known that I, VICTOR M. BACKUS, of the city of Indianapolis, in the county of Marion and State of Indiana, have invented certain new and useful Improvements in Springs for and their Connections with Sulkies and other Vehicles; and I do hereby declare that the following is a full, clear, and exact description of the invention, which will enable others skilled in the art to which it appertains to make and use the same, reference being had to the accompanying drawings, which form a part of this specification.

My invention relates to improvements in two-wheeled vehicles; and it consists in certain details of construction and arrangement of the several parts, as will be hereinafter more fully set forth in the specification and claims, and pointed out in the accompanying drawings, in which—

Figure 1 is a perspective view of a vehicle embodying my invention. Fig. 2 is a sectional view, showing the method of securing the body to the springs and the springs to the vehicle. Fig. 3 is a plan view of the device; and Fig. 4, a detail view, showing the shaft joined to the axle.

Referring more particularly to the drawings, in which similar letters of reference refer to similar parts, G represents the shafts, which are curved backward, as shown in Figs. 1 and 2, and are secured at their rear ends to the axle in any suitable way.

The spring consists of three leaves, A A' A². The upper leaf, A², is secured to the cross-bar C by a bolt, $d$, or other suitable fastening device, while the lower one is secured to the axle by a clip, C', so as to bring it in front of said axle, and is secured thereto by any suitable fastening device. The bottom of the bed or body B is fastened to the spring, as shown in Fig. 2. The body is joined to the springs, and the springs to the axle and the shafts, or to the T-iron, which connects the cross-bar and shafts in such manner that the body will have a rocking instead of an up-and-down motion. I may, however, make the spring in two parts, one of which shall go from the cross-bar to the body, or to the front end of a bearing-bar upon which the body rests, and the other goes from the body or the rear end of such bearing-bar to the axle; and these two springs may be fastened to each other and to the bearing-bar or body in any suitable way. A bar, H, runs along the axle from one spring-fastening to the other, as shown in Fig. 2. I may also secure the springs either in front or behind the axle and cross-bar, and above or under the same.

By hanging the body and forming the springs and securing them as described a two-wheeled vehicle obtains a rocking swinging motion, like the motion of a "Concord" coach, instead of a mere direct up-and-down motion, which has always heretofore resulted from two-wheeled vehicles. The very motion of a trotting-horse (up and down) is converted by this device into a rolling or swinging motion. A vehicle constructed in this way gives lightness and grace, and at the same time has great strength and stability. Moreover, in such construction the foot-board or toe-rest is affected by the spring the same as the rest of the body, so that no different motion is felt by the feet, while in other carts the toe-rest or foot-board is subject to the shock of the motion of the cart, and hence to a motion different from the rest of the body.

Having thus described my invention, what I claim as new, and desire to secure by Letters Patent, is—

1. A two-wheeled vehicle having the bottom or foot-rest of the body secured to springs, one leaf of each spring being curved upward and secured to the front cross-bar of the vehicle, and one leaf curved downward and secured in a clip in front of the axle, whereby the body receives a rocking swinging motion, substantially as described, and for the purpose set forth.

2. A vehicle-spring composed of two or more leaves, one of said leaves being secured to the shafts and body of the vehicle, and one leaf secured to the axle, the leaves being suitably secured to each other, substantially as and for the purpose set forth.

3. In a vehicle, a spring composed of two or more leaves, A A' A², the upper leaf being secured to the shaft-iron or cross-bar, the lower leaf being secured at its lower end to the axle by a clip or shackle, so as to bring said lower ends in front of the axle, the ends of the leaves being connected by rods H, substantially as and for the purpose set forth.

4. In vehicles, the combination of the body B with the springs A A' A², secured to the shafts and the running-gear, and the rod or bar H, running from one spring-fastening to the other, substantially as shown and described, and for the purpose set forth.

In testimony that I claim the foregoing as my own I have hereunto affixed my signature in presence of two witnesses.

VICTOR M. BACKUS.

Witnesses:
SALMON A. BUELL,
M. F. ROBINSON.